United States Patent
Hsueh et al.

(10) Patent No.: US 11,126,581 B2
(45) Date of Patent: Sep. 21, 2021

(54) RECONFIGURABLE TRANSMITTER

(71) Applicant: Intel Corporation, Santa Clara, CA (US)

(72) Inventors: Tzu-Chien Hsueh, Portland, OR (US); Ganesh Balamurugan, Hillsboro, OR (US); Bryan K. Casper, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/882,408

(22) Filed: May 22, 2020

(65) Prior Publication Data

US 2020/0356516 A1 Nov. 12, 2020

Related U.S. Application Data

(63) Continuation of application No. 16/258,429, filed on Jan. 25, 2019, now Pat. No. 10,664,430, which is a
(Continued)

(51) Int. Cl.
| | |
|---|---|
| *G06F 13/40* | (2006.01) |
| *G06F 1/18* | (2006.01) |
| *H04L 25/02* | (2006.01) |
| *G06F 1/3287* | (2019.01) |
| *G06F 1/3296* | (2019.01) |

(Continued)

(52) U.S. Cl.
CPC .......... *G06F 13/4072* (2013.01); *G06F 1/189* (2013.01); *G06F 1/3287* (2013.01); *G06F 1/3296* (2013.01); *G06F 13/36* (2013.01); *H04L 25/0272* (2013.01); *G06F 13/20* (2013.01); *G06F 13/4282* (2013.01)

(58) Field of Classification Search
CPC .......... G06F 13/20; G06F 13/36; G06F 13/40; G06F 13/4063; G06F 13/4068; G06F 13/4072; G06F 13/4086; G06F 13/4282; G06F 1/189; G06F 1/3287; G06F 1/3296; H04L 25/0272; H04L 25/028
See application file for complete search history.

(56) References Cited

U.S. PATENT DOCUMENTS

| | | | |
|---|---|---|---|
| 3,460,047 A | 8/1969 | Gilbert | |
| 3,600,598 A | 8/1971 | Foerster | |

(Continued)

FOREIGN PATENT DOCUMENTS

| | | |
|---|---|---|
| DE | 102015001917 | 9/2015 |
| TW | 200501608 | 1/2005 |
| TW | 200509524 | 3/2005 |

OTHER PUBLICATIONS

Final Office Action from U.S. Appl. No. 14/218,684 notified Aug. 1, 2016, 25 pgs.
(Continued)

*Primary Examiner* — Thomas J. Cleary
(74) *Attorney, Agent, or Firm* — Schwabe, Williamson & Wyatt, P.C.

(57) ABSTRACT

Described is a reconfigurable transmitter which includes: a first pad; a second pad; a first single-ended driver coupled to the first pad; a second single-ended driver to the second pad; a differential driver coupled to the first and second pads; and a logic unit to enable of the first and second single-ended drivers, or to enable the differential driver.

20 Claims, 7 Drawing Sheets

Related U.S. Application Data continuation of application No. 15/440,568, filed on Feb. 23, 2017, now Pat. No. 10,216,680, which is a continuation of application No. 14/218,684, filed on Mar. 18, 2014, now Pat. No. 9,582,454.

(51) Int. Cl.
*G06F 13/36* (2006.01)
*G06F 13/20* (2006.01)
*G06F 13/42* (2006.01)

(56) References Cited

U.S. PATENT DOCUMENTS

| | | | |
|---|---|---|---|
| 5,361,041 | A | 11/1994 | Lish |
| 5,585,740 | A | 12/1996 | Tipon |
| 5,606,268 | A | 2/1997 | Van Brunt |
| 5,955,924 | A | 9/1999 | Bryan et al. |
| 6,518,608 | B1 | 2/2003 | Takizawa |
| 6,566,911 | B1 | 5/2003 | Moyer |
| 6,643,324 | B1 | 11/2003 | Gasparik |
| 6,691,239 | B1 | 2/2004 | Rose |
| 6,856,178 | B1 | 2/2005 | Narayan |
| 6,999,540 | B2 | 2/2006 | Cranford, Jr. |
| 7,358,771 | B1 | 4/2008 | Talbot |
| 7,411,421 | B1 | 8/2008 | Steinke et al. |
| 7,471,107 | B1* | 12/2008 | Fortin ............. H03K 19/00384 326/83 |
| 8,400,186 | B1 | 3/2013 | Wang et al. |
| 8,519,771 | B1 | 8/2013 | Cical et al. |
| 8,536,894 | B1 | 9/2013 | Tan |
| 8,638,838 | B1 | 1/2014 | Betts et al. |
| 9,582,454 | B2 | 2/2017 | Hsueh et al. |
| 10,216,680 | B2 | 2/2019 | Hsueh et al. |
| 2002/0060589 | A1* | 5/2002 | Ziemer ................. G11B 19/20 327/108 |
| 2002/0136051 | A1 | 9/2002 | Hardee et al. |
| 2005/0022149 | A1 | 1/2005 | Smith et al. |
| 2005/0237082 | A1 | 10/2005 | Shumarayev et al. |
| 2007/0013411 | A1* | 1/2007 | Asaduzzaman ...... H03K 17/164 326/83 |
| 2007/0042722 | A1 | 2/2007 | Kim |
| 2007/0120726 | A1 | 5/2007 | Yung et al. |
| 2007/0121716 | A1 | 5/2007 | Nagarajan et al. |
| 2008/0030588 | A1 | 2/2008 | Boss et al. |
| 2008/0189455 | A1 | 8/2008 | Dreps et al. |
| 2009/0138658 | A1 | 5/2009 | Dreslinski, Jr. et al. |
| 2009/0153219 | A1* | 6/2009 | Wu .................... H03F 3/45179 327/333 |
| 2009/0172215 | A1 | 7/2009 | Rashid |
| 2009/0231319 | A1 | 9/2009 | Tsuchi |
| 2009/0271167 | A1 | 10/2009 | Zhu et al. |
| 2009/0300562 | A1 | 12/2009 | Xu et al. |
| 2010/0164539 | A1* | 7/2010 | Balamurugan ............ H03K 19/018585 326/30 |
| 2011/0221502 | A1 | 9/2011 | Meijer et al. |
| 2011/0316590 | A1 | 12/2011 | Chang et al. |
| 2012/0032714 | A1* | 2/2012 | Shimazaki ....... H03K 17/04123 327/109 |
| 2012/0309456 | A1 | 12/2012 | Yamamoto et al. |
| 2013/0163126 | A1* | 6/2013 | Dong .................. G06F 13/4086 361/56 |
| 2013/0194881 | A1 | 8/2013 | Woo et al. |
| 2014/0035549 | A1* | 2/2014 | Hafizi ...................... G05F 3/08 323/311 |
| 2014/0238494 | A1* | 8/2014 | Schweikert ............. H01F 7/064 137/1 |
| 2014/0301173 | A1* | 10/2014 | Kuehlwein .............. G11B 5/02 369/13.26 |
| 2014/0368272 | A1* | 12/2014 | Wang .................. H03F 3/45071 330/260 |

OTHER PUBLICATIONS

Final Office Action from U.S. Appl. No. 15/440,568 notified May 21, 2018, 33 pgs.
Final Office Action from U.S. Appl. No. 16/258,429 notified Nov. 19, 2019, 19 pgs.
First Office Action dated Feb. 22, 2017 for Chinese Patent Application No. 201510083812.1.
First Office Action, dated Aug. 30, 2016, for CNUM Patent Application No. 201620385387.1.
International Preliminary Report on Patentability for PCT/US2015/014654 dated Sep. 29, 2016, 9 pages.
International Search Report and Written Opinion, dated May 14, 2015, for PCT Application No. PCT/US2015/014654.
Non-Final Office Action from U.S. Appl. No. 14/218,684 notified May 5, 2016, 26 pgs.
Non-Final Office Action from U.S. Appl. No. 15/440,568.
Non-Final Office Action from U.S. Appl. No. 16/258,429 notified Jul. 25, 2019, 29 pgs.
Notice of Allowance for Chinese Patent Application No. 201520112594.5, dated Feb. 14, 2016.
Notice of Allowance for Taiwan Patent Application No. 104104232, dated Apr. 27, 2016.
Notice of Allowance from U.S. Appl. No. 14/218,684 notified Oct. 3, 2016, 8 pgs.
Notice of Allowance from U.S. Appl. No. 15/440,568 notified Jul. 27, 2018, 8 pgs.
Notice of Allowance from U.S. Appl. No. 16/258,429 notified Jan. 29, 2020, 10 pgs.
Notice of Grant from Chinese Patent Application No. 201510083812.1 notified Feb. 27, 2018, 3 pgs.
Notice of Grant from Chinese Patent Application No. 201620385387.1 notified Mar. 6, 2018, 3 pgs.
Office Action and Search Report for Taiwan Patent Application No. 104104232, dated Nov. 25, 2015, with translation, 18 pages.
Office Action and Search Report, dated Dec. 14, 2016, for Taiwan Patent Application No. 105116644.
Office Action for Chinese Patent Application No. 201520112594.5, dated Aug. 5, 2015.
Office Action for Chinese Patent Application No. 201520112594.5, dated May 6, 2015.
Office Action from Chinese Patent Application No. 201620385387.1 notified Feb. 27, 2017, 1 pg.
Office Action dated Sep. 25, 2017 for Chinese Patent Application No. 201510083812.1.
Third Office Action dated Jun. 14, 2017 for Chinese Patent Application No. 201620385387.1.
"An Introduction to FETs", Siliconix, Mar. 1997, 5 pgs.
Horowitz, Mark, "Lecture 15: Transmitter Receiver and Design", 2000. Computer Systems Laboratory. Stanford University, pp. 1-35.
Johnson, Mark C. et al., "A model for leakage control by MOS transistor stacking", Paper 79, ECE Technical Reports, Purdue University, Dec. 1997, 33 pgs.
Lee, Edward, "High-Speed Data Link Design and Simulation", University of Illinois at Urbana-Champaign, 2009, 27 pgs.
Palermo, Sam, "ECEN689: Special Topics in High-Speed Links. Circuits and Systems", Spring 2010. Analog & Mixed Signal Center. Texas A&M University, pp. 1-16.
Song, Heesoo et al., "A Reduced-Swing Voltage-Mode Driver for Low-Power Multi-Gb/s Transmitters", Journal of Semicounductor Technology and Science. vol. 9, No. 2. Jun. 2009, pp. 104-109.

* cited by examiner

RECONFIGURABLE TRANSMITTER

CLAIM FOR PRIORITY

This application is a continuation of, and claims the benefit of priority of U.S. patent application Ser. No. 16/258,429, filed 25 Jan. 2019, entitled "RECONFIGURABLE TRANSMITTER," which is a continuation of, and claims priority to, U.S. patent application Ser. No. 15/440,568, filed 23 Feb. 2017, entitled "RECONFIGURABLE TRANSMITTER," which is a continuation of, and claims priority to, U.S. patent application Ser. No. 14/218,684, filed on 18 Mar. 2014, entitled "RECONFIGURABLE TRANSMITTER," which are incorporated by reference in their entirety.

BACKGROUND

A wide range of memory configurations exist in today's high-speed digital systems to meet platform-specific bandwidth, power, capacity, and cost constraints. For example, DDR4 (Double Data Rate IV) and GDDR5 (Graphics Double Data Rate V) based transceivers are expected to meet the needs of server, client, graphics, and mobile platforms. I/O (input-output) interfaces may need additional area and circuits to support bidirectional data transmission in combination with unidirectional data transmission.

For example, current DDR I/O drivers are primarily implemented as unidirectional push/pull devices with passive linearizing resistors. Due to passive resistor variation and low resistance density, the passive linearizing resistors increase significant area, pad capacitance, and metal routing complexity for the DDR I/O drivers. Supply regulation of a voltage-mode driver relies on certain amount of on-die de-coupling capacitors. This also takes up significant area. To support various I/O standards including unidirectional and bidirectional I/O interfaces using the same I/O driver may result in a large and complex design.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
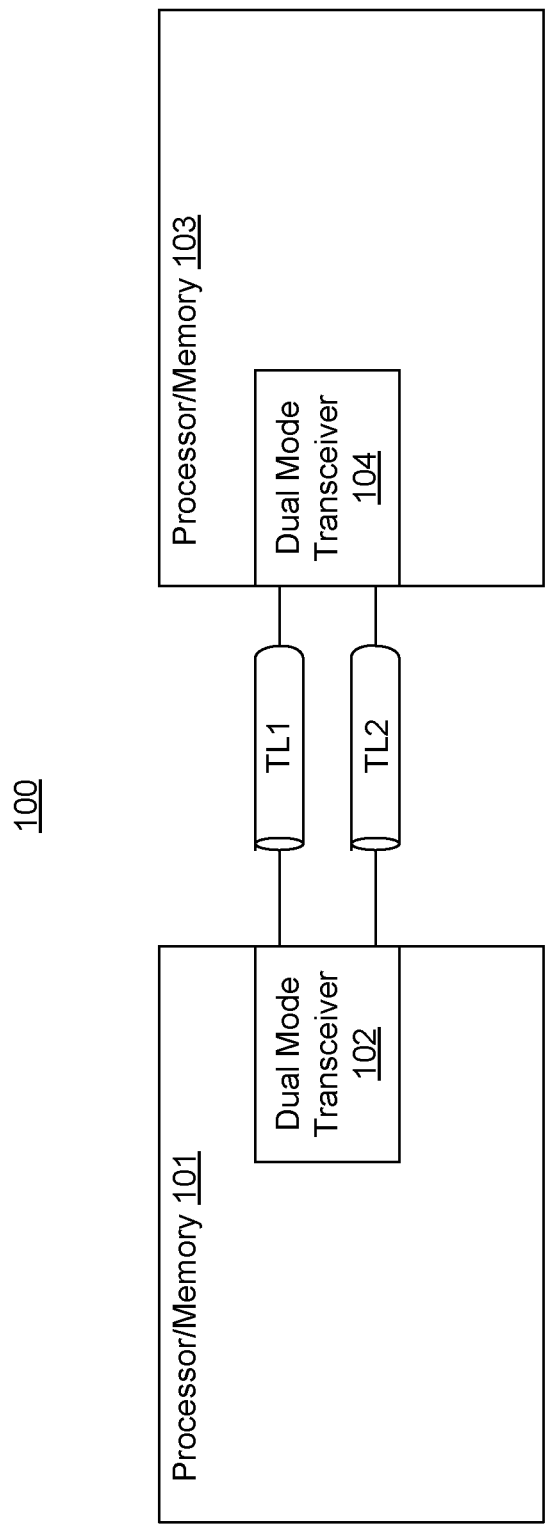
FIG. 1 illustrates a computing system using a Dual-Mode Transceiver, according to one embodiment of the disclosure.

Some embodiments describe a Dual-Mode transceiver that meets signaling specifications of many memory interfaces such as DDR4, GDDR5, and high-speed differential signaling interfaces. Here, Dual-Mode refers to the transceiver being capable of operating in single-ended large-swing voltage-mode signaling and differential low-swing voltage-mode signaling. Due to the variety of electrical signaling characteristics in terms of channel loss, I/O circuit architectures, power consumption requirements and system level applications, the single-ended large-swing signaling is suitable for current DDR4 and GDDR5 specifications (hereafter referred to as DDR-mode). The differential low-swing signaling may be more power-efficient for when operating at high speeds (e.g., 16 Gb/s high-speed data links). The high speed mode is hereafter referred to as HSD-mode.

In the future, differential signaling with high-speed serial I/O enhancements will potentially continue I/O performance scaling for post-DDR4 and future buffered memory solutions. A unified memory interface that can meet the signaling requirements of all these memory standards offers several benefits: reduced cost and design time, greater platform design flexibility, and a smoother transition from DDR4/GDDR5 to a high-speed differential memory interface. Overall, it is the trend to have a unified transceiver design to support multiple memory specs, legacy compatibility, and performance scalability.

To reach these goals, I/O designers have to overcome significant differences in several signaling specs, simplify high-voltage tolerance techniques and minimize area, and channel loss overheads due to reconfigurability. Area overhead could be significant to support different transmitter output swings, different channel equalization, and bidirectional data transmission capability. Currently, DDR drivers are primarily implemented by push/pull devices with passive linearizing resistors. Passive resistor implementation increases silicon area, pad capacitance and metal routing complexity due to the nature of its high process variation and low resistance area density. Also, low-swing high-speed voltage-mode driver may require certain amount of on-die de-coupling capacitor for supply regulation.

To solve these and other problems, some embodiments of the Dual-Mode transceiver are described that can operate in unidirectional or bidirectional modes. Some embodiments use only thin-gate-oxide devices while providing electrical overstress protection to devices exposed to higher power supplies (i.e., power supply levels that are higher than nominal powers supply levels supported by the process technology node). Some embodiments use only active devices in the drivers i.e., no passive linearizing resistors are used. Some embodiments use different order of pre-emphases (equalization) depending on the mode of driving. Some embodiments use a current compensation scheme to reduce capacitor size.

In one embodiment, the Dual-Mode transceiver is operable to support non-simultaneous bidirectional data transmission. Here, non-simultaneous bidirectional data transmission refers to either one of the terminals of the data transmission line being assigned as a transmitter and then the other terminal will be the receiver correspondingly, but the two terminals may not be transmitters (or receivers) simultaneously.

In one embodiment, symmetric post-cursor and pre-cursor high-speed differential transmitter data path is split into two individual single-ended large-swing post-cursor data paths. For example, the two individual single-ended data paths are DDR compliant data paths (e.g., 3.2 Gb/s 1.2V DDR4 compliant data paths, or 6.4 Gb/s 1.5V GDDR5 compliant data paths) while the high-speed differential data path (e.g., 25 Gb/s 1V data path) is the low swing differential data path. In one embodiment, in the receiver mode, the transmitter driver push-up, pull-down and equalization-switch devices are biased such that by turning ON/OFF driver legs, the transmitter driver can be configured as receiver termination and a common-mode bias generator.

In one embodiment, area-intensive passive resistors are removed and replaced by a parallel combination of complementary p-type and n-type diode/triode operating region devices that achieve large swing and on-die termination linearity with less area compared to passive resistors. In one embodiment, high-frequency driver current variation on the transmitter swing control regulator is cancelled by injecting data dependent current from the power supply.

To support Dual-Mode reconfigurability and reduce the area and power overheads due to this reconfigurability feature, some embodiments of the Dual-Mode transceiver have common clocking circuit, transmitter equalization control logic, serializer, and regulator to maximize circuit re-use. In one embodiment, the Dual-Mode transceiver has separate transmitter pre-drivers, drivers, and receiver front-ends to meet significant signaling difference between DDR-mode and HSD-mode. In one embodiment, two identical equalization control logics are provided with a common data stream input such that one of the two equalization control logics can be set to generate cursor/post-cursor signals, and the other of the two equalization control logics can be set to generate cursor/pre-cursor signals. In one embodiment, the outputs of these equalization control logics, which are cursor, post-cursor and pre-cursor signals, are distributed to an HSD-mode driver (e.g., a 32-leg HSD mode driver) for multi-tap (e.g., 3-tap) linear equalization. In one embodiment, the HSD-mode transmitter uses a regulator for its low-swing voltage-mode driver swing control and supply regulation. In one embodiment, this regulator directly uses the digital transmitter circuit supply and provides around high power supply noise rejection ratio (e.g., 20 dB PSRR).

In one embodiment, the two equalization control logics have the same setting to generate cursor/post-cursor signals for lower tap (e.g., 2-tap) equalization. In one such embodiment, the input data streams to the two equalization control logics are individual data streams. In one embodiment, outputs of the two equalization control logics are distributed to their own DDR-mode drivers (e.g., 64-leg DDR-mode driver). In such an embodiment, the entire transmitter datapath is split into two identical data-paths carrying two independent data streams for two individual single-ended 2-tap DDR-mode data transmissions. In one embodiment, in the DDR-mode, the regulator is configured as $V_{SSHI}$ generator for high-voltage tolerance to support high-voltage supply $V_{DDQ}$ (also referred here as the first power supply) of the two independent DDR drivers.

In one embodiment, the HSD-mode driver comprises several identical unit legs (e.g., 32 identical legs). In one embodiment, each leg is fully NMOS push-pull differential low-swing voltage-mode driver. In one embodiment, there are NMOS equalization switches positioned between the complimentary differential outputs of each driver leg. In the transmitter mode, the transmitter termination control and 3-tap differential equalizer can be implemented by properly distributing cursor, post-cursor and pre-cursor signals to the entire 32 unit driver legs (Note that differential equalization can eliminate duplicate current consumption in the driver to improve power efficiency, but it may require high-speed logic to drive the equalization switches and push-pull devices). In one embodiment, both push-pull and equalization-switch devices are part of the transmitter termination. In one embodiment, the equalization-switch devices in the differential driver can be turned ON as a differential receiver termination in the receiver mode. In one embodiment, with an AC-coupled channel, a few push-pull devices in the differential driver can be turned ON to support receiver common-mode voltage generation.

Under certain process, temperature and supply voltage conditions, the HSD-mode transmitter may use 'N' legs (e.g., less than or equal to 32) of driver unit to be turned ON for providing transmitter termination (e.g., 50 Ohm transmitter termination). If 'a' number of these 'N' legs are controlled by the post-cursor signal, and 'b' number of 'N' legs are controlled by the pre-cursor signal, then N-a-b number of legs are controlled by cursor signal. The post-cursor equalization coefficient 'α' is 0.5·a/N, and the pre-cursor equalization coefficients 'β' is 0.5·b/N. The termination and equalization control resolutions are $\log_2(N)$ and $\log_2(2N)$, respectively, in the HDS-mode transmitter. In one embodiment, the equalization control logics, including multiplexer, AND gate and XNOR gate, are consolidated and implemented by similar cascode CMOS logics to match the gate delays and reduce timing variations at the input of the serializer.

HSD-mode driver current consumption may be data dependent and related to the equalization coefficient settings. This data-dependent driver current may render high-frequency self-induced noise at the differential driver supply, which is the regulator output. The regulator may rely on a huge de-coupling capacitor to reduce the impact of this self-induced noise. In one embodiment, a data-dependent current compensation scheme is employed to mitigate the problem of high-frequency driver current variation on the HSD-mode swing-control regulator. Since the current variation (ΔI) occurs whenever the equalization switch input toggles and the variation magnitude is proportional to equalization coefficients, in one embodiment the equalization switch input signal is reused to enable a current path in each driver leg. In one embodiment, the compensation scheme enables a significant regulator output capacitor reduction by mitigating high-frequency current variations in the regulator load.

In one embodiment, the DDR-mode large-swing driver is entirely implemented by thin-gate-oxide devices. In such an embodiment, the all-active DDR-mode large-swing driver uses a parallel combination of complementary P/N, diode-/triode-region devices to achieve driver/on-die termination (ODT) linearity without the use of area-intensive passive resistors. In one embodiment, the complementary active resistor can achieve very low resistance variation (e.g., less than ±10% resistance variation) over a wide voltage range (e.g., 50% to 95% of $V_{DDQ}$ DDR4 output swing range). The DDR-mode transmitter may use 'N' legs (e.g., less than or equal to 64) of driver unit to be turned ON for providing transmitter termination (e.g., 50 Ohm transmitter termination). The termination and equalization control resolutions are both $\log_2(N)$ in the DDR-mode transmitter.

In one embodiment, the combination of the complementary active resistor and cascode triode-region devices also enables high-voltage tolerance (HVT) without any extra supply or bias voltage reconfiguration between DDR-mode and HSD-mode. In one embodiment, cascoding and level-shifting pre-drivers enable high-voltage tolerance using only thin-gate-oxide devices as well. In one example, with independent 64-leg push-up (PU) and pull-down (PD) impedance controls, each single-ended DDR-mode driver can meet DDR4 specification for push/pull impedance matching, resolution and range requirements. By eliminating passive resistors, some embodiments can significantly reduce area overhead due to resistor process variation and low resistance density. For example, in 22 nm CMOS process, the DDR-mode driver area efficiency improvement is better than 2× with respect to a design using linearizing resistors. In one embodiment, the HSD-mode swing-control regulator is configured as a $V_{SSHI}$ (=$V_{DDQ}$−1V) generator for the level shifters (LS) used for HVT in DDR-mode.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology. The term "scaling" generally also refers to downsizing layout and devices within the same technology node. The term "scaling" may also refer to adjusting (e.g., slow down) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFET transistors, Gate All Around Cylindrical Transistors or other devices implementing transistor functionality like carbon nanotubes or spintronic devices. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 illustrates a computing system 100 using a Dual-Mode transceiver, according to one embodiment of the disclosure. In one embodiment, computing system 100 comprises Processor/Memory 101 and Processor/Memory 103, each having the Dual-Mode transceivers 102 and 104, respectively, transmission lines (TL) i.e., TL1 and TL2. In one embodiment, Dual-Mode Transceiver 102 includes a first pad coupled to TL1; and a second pad coupled to TL2. In one embodiment, Dual-Mode Transceiver 102 includes a first single-ended driver (e.g., DDR4 or GDDR5 compliant driver) coupled to the first pad; and a second single-ended driver (e.g., another DDR4 or GDDR5 compliant driver) to the second pad. In one embodiment, Dual-Mode Transceiver includes a differential driver (e.g., the differential driver having data transmission speed higher than 16 Gb/s) coupled to the first and second pads for differential signaling; and a logic unit to enable entire data path for the differential pre-driver/driver or to split the data path into two for the first and second independent single-ended pre-drivers/drivers.

Figure 2:
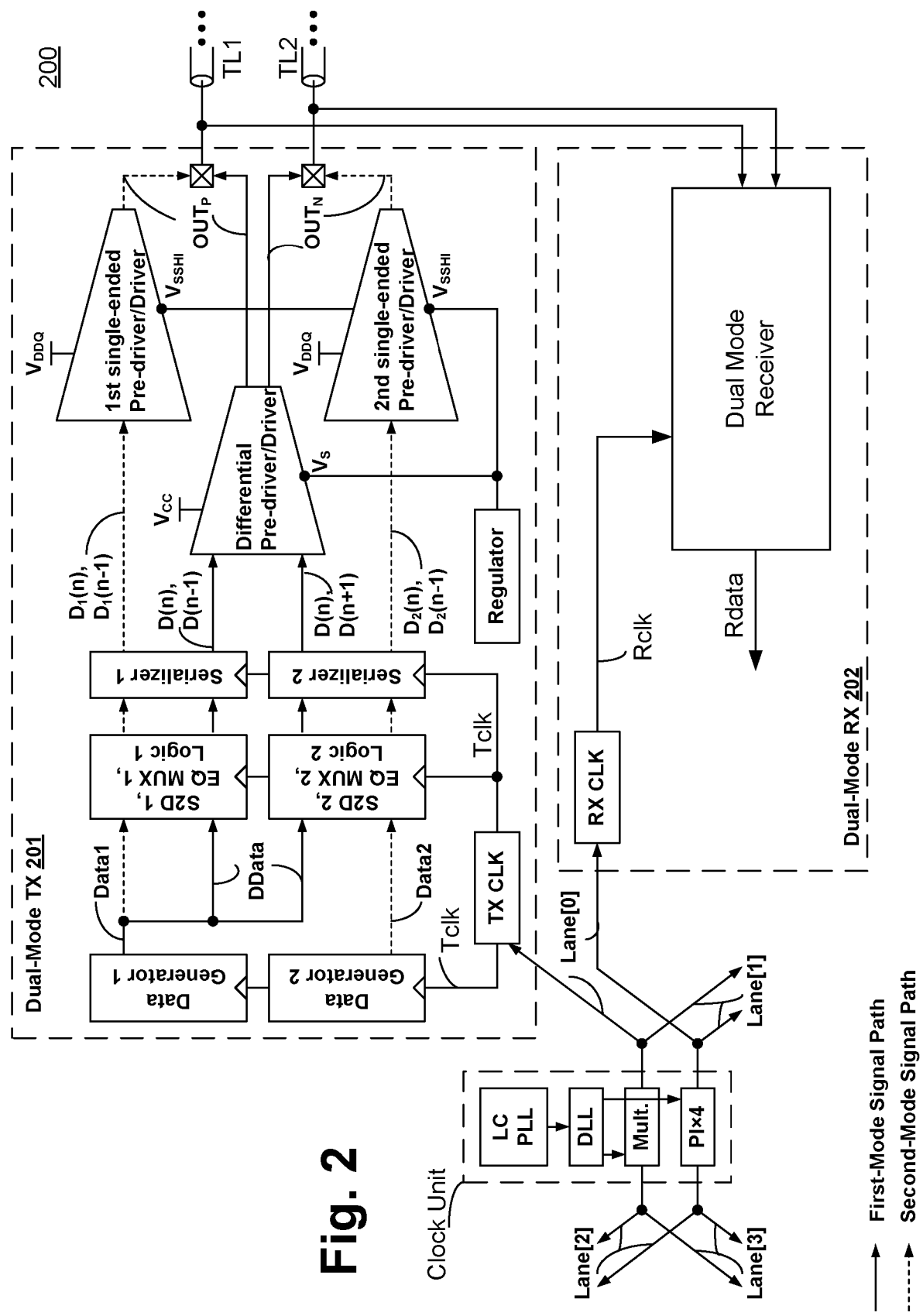
FIG. 2 illustrates a block level architecture of the Dual-Mode Transceiver, according to one embodiment of the disclosure.

FIG. 2 illustrates a block level architecture 200 of the Dual-Mode Transceiver 102, according to one embodiment of the disclosure. It is pointed out that those elements of FIG. 2 having the same reference numbers (or names) as the elements of any other figure can operate or function in any manner similar to that described, but are not limited to such.

In one embodiment, architecture 200 comprises Dual-Mode TX (Transmitter) 201, Dual-Mode RX (Receiver) 202, and Clock Unit. In one embodiment, Dual-Mode TX 201 comprises First and Second pads, First single-ended Pre-driver/Driver (e.g., DDR4 or GDDR5 compliant driver), Second single-ended Pre-driver/Driver (e.g., another DDR4 or GDDR5 compliant driver), Differential Pre-driver/Driver (e.g., high-speed low-swing driver), Regulator, single-ended-to-differential 1 (S2D 1), Equalizer Multiplexer 1 (EQ MUX 1), Logic 1, Serializer 1, S2D 2, EQ MUX 2, Logic 2, Serializer 2, Data Generator 1, Data Generator 2, and TX Clock (CLK) buffer.

In one embodiment, Dual-Mode Transceiver 200 comprises: a First power supply node to provide a First power supply, $V_{DDQ}$ (e.g., 1.2V or 1.5V) to the First and Second single-ended Pre-drivers/Drivers; and a Second power supply node to provide a Second power supply, $V_{CC}$ (e.g., 1V) to the entire transceiver except First and Second single-ended Pre-drivers/Drivers and the Differential Driver, wherein voltage level of the First power supply (e.g., 1.2V for DDR4, and 1.5V for GDDR5) is higher than voltage level of the second power supply (e.g., 1V).

In one embodiment, Dual-Mode Transceiver 200 further comprises a Regulator which can be configured to provide regulated current from the Second power supply node, $V_{CC}$, to the Differential Driver power supply node (i.e., the third power supply node), $V_S$, or to provide bias voltage, $V_{SSHI}$, for high-voltage tolerance from the First power supply, $V_{DDQ}$. In one embodiment, Dual-Mode Transceiver 200 reuses existing logic control according to logic level of equalization data to enable the current path from the Second power supply, $V_{CC}$, to the regulator output, $V_S$, which is the differential driver power supply node. In such an embodiment, high-frequency data-dependent driver current variation on the transmitter swing-control regulator is cancelled by injecting data dependent current to the Differential Driver power supply, $V_S$ (also referred here as the Third power supply). This current compensation scheme may allow the size reduction of the decoupling capacitors.

In one embodiment, when the First and Second single-ended Pre-drivers/Drivers are enabled, then the Differential Pre-driver/Driver is disabled (i.e., tri-stated). Here, the dashed line signal path is the path when the First and Second single-ended Pre-drivers/Drivers are enabled (i.e., Second-Mode Signal Paths) while the solid line signal path is the path when the Differential Pre-driver/Driver is enabled (i.e., First-Mode Signal Path). In such an embodiment, First and Second single-ended Pre-drivers/Drivers drive respective signals $OUT_P$ and $OUT_N$ on the First and Second pads. In one embodiment, when the First and Second single-ended Pre-drivers/Drivers are enabled, Data1 from Data Generator 1 and Data2 from Data Generator 2 are provided as inputs for the First and Second single-ended Pre-drivers/Drivers respectively. In one embodiment, S2D 1, EQ MUX 1, and Logic 1 applies 2-tap pre-emphasis equalization (i.e., single pose-cursor) on Data1 to provide $D_1(n)$ and $D_1(n-1)$ data streams to the First single-ended Pre-driver/Driver, where 'n' is an integer. In such an embodiment, S2D 2, EQ MUX 2, and Logic 2 applies 2-tap pre-emphasis equalization (i.e., single pose-cursor) on Data2 to provide $D_2(n)$ and $D_2(n-1)$ data streams to the Second single-ended Pre-driver/Driver, where 'n' is an integer.

In one embodiment, when the Differential Pre-driver/Driver is enabled, the First and Second single-ended Pre-drivers/Drivers are disabled. In this embodiment, the solid data path is taken instead of the dashed line signal path. In such an embodiment, Data Generator 2 is disabled, and Data Generator 1 is used to provide differential data (DData) for S2D, EX MUX and Logic units 1 and 2. In one embodiment, a higher order pre-emphasis equalization is performed by S2D, EX MUX and Logic units 1 and 2 for data to drive the Differential Pre-driver/Driver. For example, EQ MUX and S2D Logic units 1 and 2 apply 3-tap pre-emphasis (i.e., one pre-cursor and one post-cursor) with differential equalization. In this embodiment, Serializer 1 provides serialized outputs D(n) and D(n−1) as the first input to the Differential Pre-driver/Driver while Serializer 2 provides serialized outputs D(n) and D(n+1) as the second input to the Differential Pre-driver/Driver.

In one embodiment, the First and Second single-ended Pre-drivers/Drivers operate at a first power supply $V_{DDQ}$ while the Differential Pre-driver and the rest of circuits operate on a second power supply $V_{CC}$, where the first power supply has a voltage level higher than the voltage level of the second power supply. In such an embodiment, the First and Second single-ended Drivers output a higher swing signal than the signal swing of the Differential Driver. In one embodiment, the Regulator provides regulated voltages $V_S$ and $V_{SSHI}$ for the Differential Driver and the single-ended Pre-drivers/Drivers respectively. In one embodiment, when the Differential Driver is disabled, some of its transistors are biased by $V_{SSHI}$ to protect from electrical overstress (EOS) from the First power supply. In one embodiment, when the First and Second single-ended Pre-drivers/Drivers are disabled, some of its transistors are biased by $V_{SSHI}$ to protect them from potential EOS from the First power supply.

In one embodiment, the Clock Unit provides transmitter clock (TX CLK) and receiver clock (RX CLK). In one embodiment, the Clock Unit includes a phase locked loop (PLL), a delay locked loop (DLL), a frequency multiplier (Mult.), and phase interpolators (PIs) (e.g., four PIs). In one embodiment, the PLL is an LC-PLL (inductor-capacitor PLL). In other embodiments, other types of PLLs may be used. In one embodiment, output from the frequency multiplier is the clock source of the transmitters, and each PI generates the clock signal for its corresponding receiver. In this example, four lanes are shown as Lane[0] to Lane[3]. Each lane comprises a dual-mode transceiver. Here, Dual-Mode TX 201 and Dual-Mode RX 202 are in Lane[0]. The blocks labeled "TX CLK" and "RX CLK" includes duty-cycle correction and clock buffers that provide Tclk and Rclk to their respective transmitter and receiver. Dual-Mode RX 202 includes a Dual-Mode Receiver which receives data from TL1 and TL2, and generates Rdata for downstream processing.

Figure 3:
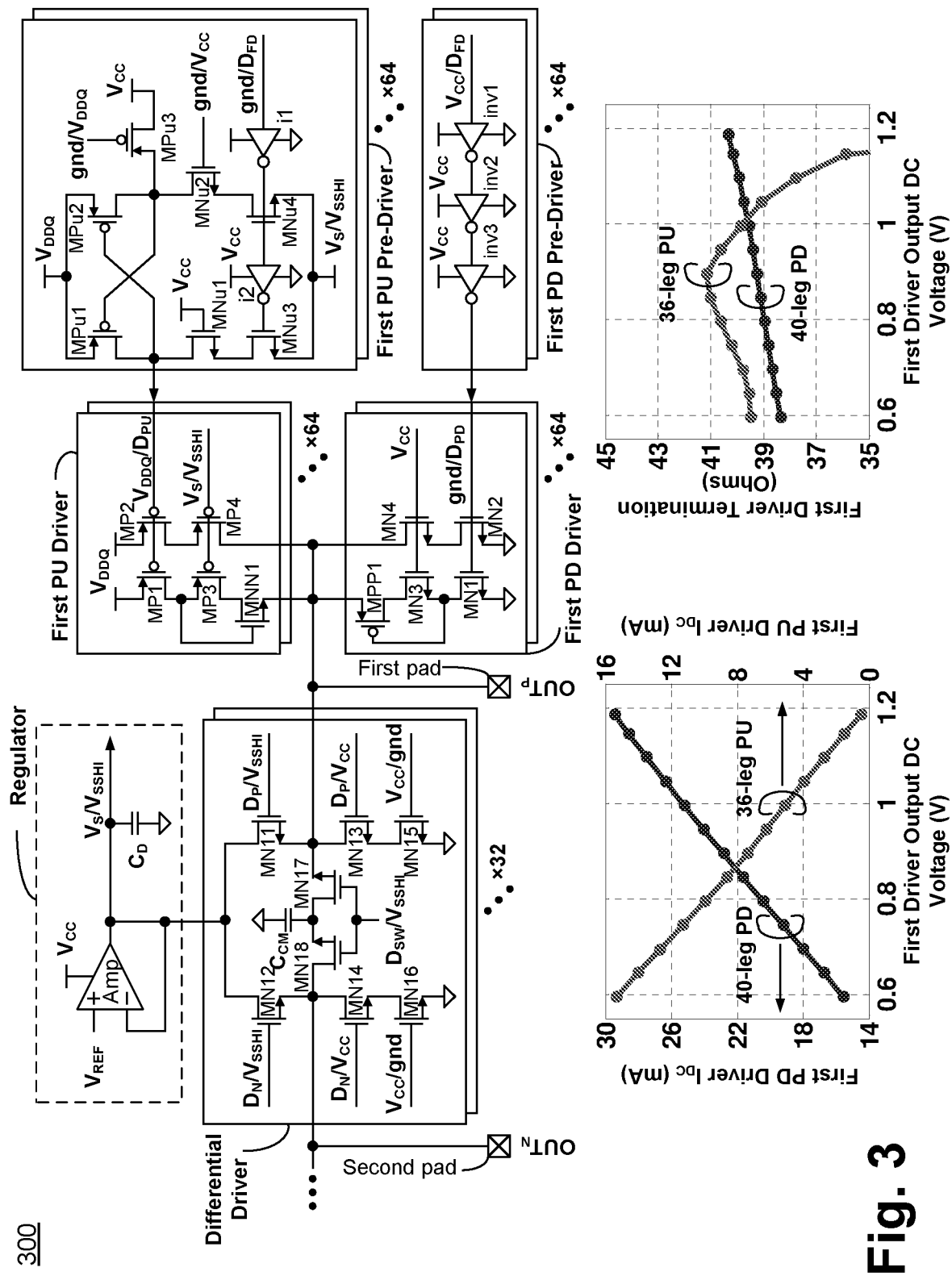
FIG. 3 illustrates circuit level architecture of the Dual-Mode Transceiver, according to one embodiment of the disclosure.

FIG. 3 illustrates circuit level architecture 300 of the Dual-Mode Transmitter Drivers, according to one embodiment of the disclosure. It is pointed out that those elements of FIG. 3 having the same reference numbers (or names) as the elements of any other figure can operate or function in any manner similar to that described, but are not limited to such.

In one embodiment, all transistors in architecture 300 are thin-gate-oxide transistors. In one embodiment, high-voltage tolerance is enabled by cascoding devices and providing appropriate gate biasing to limit voltage difference between any two terminals of gate, source, and drain of the transistors. In one embodiment, termination is implemented using only active devices to reduce area and pad capacitance. Here, push-up, pull-down and equalization-switch NMOS devices in the differential driver illustrate the termination circuits for small-swing differential transmitter mode. First Push-up (PU) and First Pull-down (PD) Drivers illustrate the termination circuit for large-swing single-ended transmitter mode. In this example, 64 unit legs of First PU Pre-Driver, First PD Pre-Driver, First PU Driver, and First PD Driver are shown; and 32 unit legs of Differential Driver are shown. Signals in FIG. 3 labeled as "signal1/signal2" e.g., $V_{DDQ}/D_{PU}$, refer to signals provided when Differential Driver is enabled and when First and Second single-ended Drivers are enabled respectively. For example, when Differential Driver is enabled, then signal1 is provided to the devices, and when the First and Second single-ended Drivers are enabled, then signal2 is provided to the devices.

In one embodiment, the First PU Driver comprises p-type devices MP1, MP2, MP3, and MP4; and n-type device MNN1. In one embodiment, MP1, MP3, and MNN1 are coupled in series such that the source terminal of MP1 is coupled to the First power supply $V_{DDQ}$ while the source terminal of MNN1 is coupled to the First pad (which provides signal $OUT_P$). In one embodiment, MNN1 is diode connected transistor because MP3 is biased to be ON which is in triode region. In such an embodiment, the gate terminal of MP3 is biased by either $V_S$ or $V_{SSHI}$ (depending on whether Differential Driver is turned ON or the First and Second single-ended drivers are turned ON). Here, MP3 and MP4 are cascode devices that operate in their triode regions and provide high-voltage tolerance to the design. In one embodiment, $V_S$ or $V_{SSHI}$ is generated by the Regulator. In one embodiment, MP3, MP4, and MNN1 together form the linearizing resistor for PU termination.

In one embodiment, PU data $D_{PU}$ (e.g., in the range of 0.2V to 1.2V) is provided by the First PU Pre-Driver to driving transistors MP1 and MP2. In one embodiment, when the Differential Driver is enabled, the gate terminals of MP1 and MP2 are driven by $V_{DDQ}$ to turn off First PU Driver while the gate terminals of MP3 and MP4 are driven by $V_S$ for high-voltage tolerance. In one embodiment, when the Differential Driver is disabled and the First and Second single-ended drivers are enabled, then the gate terminals of MP1 and MP2 are driven by $D_{PU}$ while the gate terminals of MP3 and MP4 are driven by $V_{SSHI}$ (e.g., 0.2V) for high-voltage tolerance.

In one embodiment, the First PD Driver comprises n-type devices MN1, MN2, MN3, and MN4; and p-type device MPP1. In one embodiment, MN1, MN3, and MPP1 are coupled in series such that the source terminal of MN1 is coupled to ground while the source terminal of MPP1 is coupled to the First pad (which provides signal $OUT_P$). In one embodiment, MPP1 is diode connected transistor because MN3 is biased to be ON which is in triode region. In such an embodiment, the gate terminal of MN3 is biased by $V_{CC}$ (i.e., Second power supply, e.g., 1V). Here, MN3 and MN4 are cascode devices operating in their triode regions that provide high-voltage tolerance to the design. In one embodiment, MN3, MN4, and MPP1 together form the linearizing resistor for PD termination.

In one embodiment, PD data $D_{PD}$ (e.g., in the range of 0V to 1V) is provided by the First PD Pre-Driver to driving transistors MN1 and MN2. In one embodiment, when the Differential Driver is enabled, the gate terminals of MN1 and MN2 are driven by ground (gnd) to turn OFF the First PD Driver while the gate terminals of MN3 and MN4 are driven by $V_{CC}$ for high-voltage tolerance. In one embodiment, when the Differential Driver is disabled and the First and Second single-ended drivers are enabled, then the gate terminals of MN1 and MN2 are driven by $D_{PD}$ while the gate terminals of MN3 and MN4 are driven by $V_{CC}$ (e.g., 1V) for high-voltage tolerance. In one embodiment, independent PU and PD controls allow both the First and Second single-ended Drivers to meet requirements of various I/O interface standards, including termination value, linearity, push-pull matching and swing requirements.

Two plots are shown in FIG. 3 that illustrate a highly linear termination resistance from the First PU and PD Drivers. The plot to the left hand side shows DC current ($I_{DC}$) measured at the First pad for the First PD and PU Drivers when the output voltage on the First pad changes. The plot to the right hand side shows termination resistance (in Ohms) of the First single-ended Driver when output voltage on the First pad changes. In this plot, during the First Driver output operating voltage range from 0.6V to 1.15V, termination resistance variation is within 10%.

There are several technical effects of the First PU and PD Drivers. For example, the complementary P/N triode and diode coupled devices enable resistance linearization without extra bias for high voltage tolerance; area and metal routing is reduced over conventional passive termination schemes; resistance process variation is reduced; and capacitance on First and Second pads are reduced.

In one embodiment, the First PU Pre-Driver comprises p-type devices MPu1, MPu2, and MPu3; n-type devices MNu1, MNu2, MNu3, and MNu4; and two inverters i1 and i2. In one embodiment, the inverters i1 and i2 are powered by $V_{CC}$ (i.e., Second power supply). When the First single-ended Driver is enabled, then inverter i1 receives data $D_{FD}$ which is provided as data $D_{PU}$ to the First PU Driver. In this embodiment, the gate terminal of MNu2 is biased by $V_{CC}$, the source terminals of MPu1 and MPu2 is biased by $V_{DDQ}$, and the source terminals of MNu2 and MNu4 are biased by $V_{SSHI}$. In one embodiment, when Differential Driver is enabled, the gate terminal of MPu1 is coupled to $V_{CC}$ through MPu3 to turn OFF MPu1 by assuming $V_{DDQ}-V_{CC}<|V_{TP}|$ (i.e. the thin-gate-oxide PMOS threshold voltage). In one embodiment, transistors MPu1, MPu2, MNu1, MNu2, and MNu2, and MNu4; and inverter i2 together implement a cascode level-shifter (LS) that enables high-voltage tolerance using only thin-gate-oxide devices. Here, MNu1 and MNu2 are cascode devices.

In one embodiment, the First PD Pre-Driver includes a chain of inverters (inv1, inv2, and inv3) that provide input to the First PD Driver and match the delay of the First PU Pre-Driver. In one embodiment, the inverters are powered by the Second power supply $V_{CC}$. In one embodiment, inv1 receives $V_{CC}$ (when the Differential Driver is enabled) or $D_{FD}$ (when the First and Second single-ended Drivers are enabled) and provides gnd or $D_{PD}$ to the First PD Driver. In one embodiment, the Regulator comprises an amplifier (AMP) that is powered by the Second power supply $V_{CC}$ and generates $V_S$ or $V_{SSHI}$ according to reference voltage $V_{REF}$, where $C_D$ is a decoupling capacitor. In other embodiments, other implementations for the Regulator may be used.

Figure 5A:
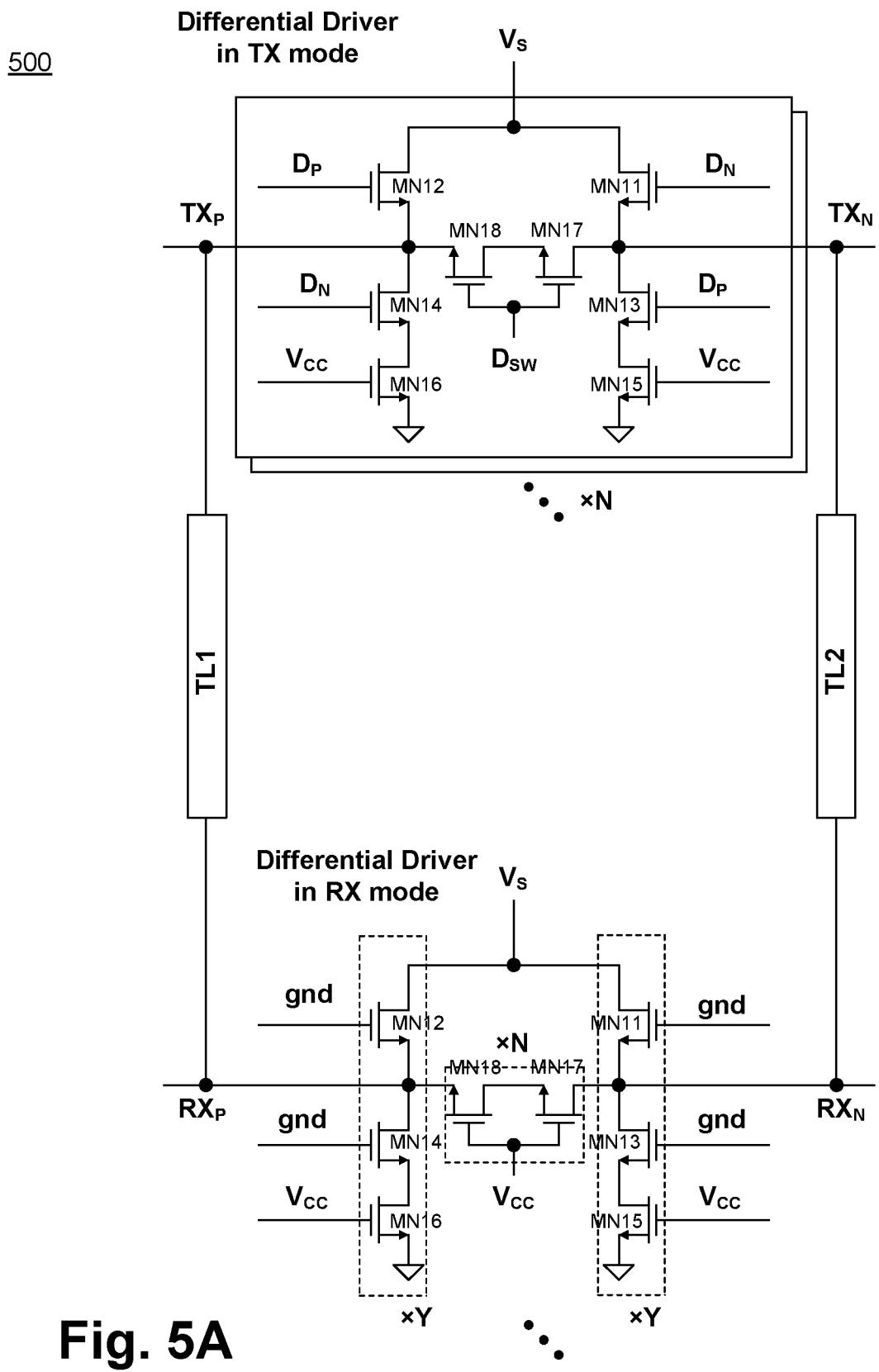
FIG. 5A illustrates transmitter and receiver modes of the differential driver configurations with DC coupling, according to one embodiment of the disclosure.
Figure 5B:
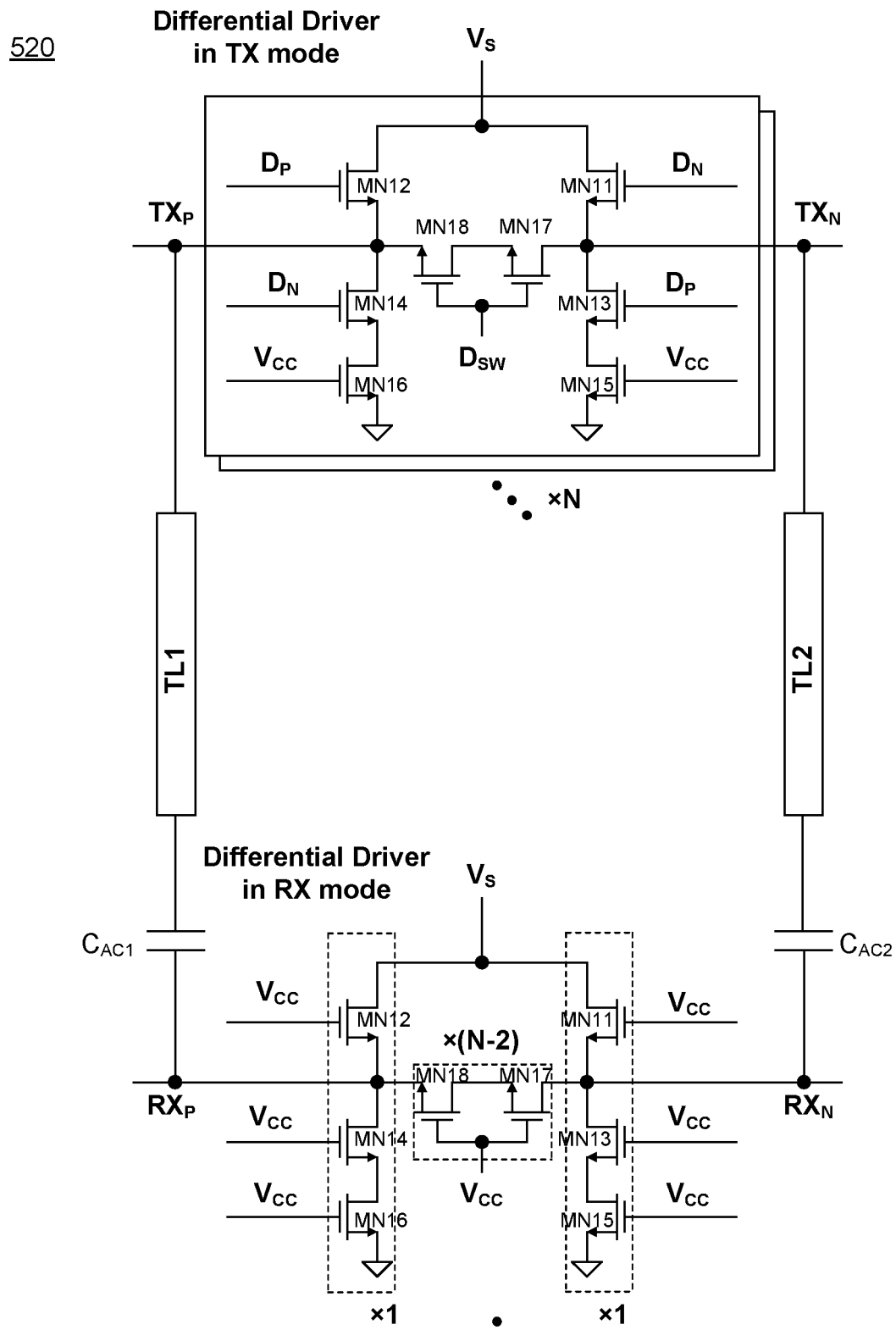
FIG. 5B illustrates transmitter and receiver modes of the differential driver configurations with AC coupling, according to one embodiment of the disclosure.

In one embodiment, the Differential Driver drives a differential output on the First and Second pads respectively (i.e., differential signals $OUT_P$ and $OUT_N$). In one embodiment, the Differential Driver comprises n-type devices MN11, MN12, MN13, MN14, MN15, MN16, MN17, and MN18; and common mode capacitor $C_{CM}$ as shown. Here, MN11 and MN12 are pull-up devices; MN13 and MN14 are push-down devices; MN15 and MN16 are always ON when the Differential Driver is enabled; MN17 and MN18 are equalization switches to perform differential equalization with push-up and pull-down devices on signals $OUT_P$ and $OUT_N$. In one embodiment, when the Differential Driver is disabled, MN13 and MN14 are biased at $V_{CC}$ and become cascode devices for high-voltage tolerance, and MN15 and MN16 are biased at ground to shut OFF the pull-down paths. In one embodiment, MN17 and MN18 are controlled by $D_{SW}$ when the Differential Driver is enabled, otherwise the gate terminals of MN17 and MN18 are coupled to $V_{SSHI}$ when the First and Second single-ended drivers are enabled. In one embodiment, when the Differential Driver is enabled, it receives data $D_P$ and $D_N$. In one embodiment, when the Differential Driver is disabled, it receives signals $V_{SSHI}$, $V_{CC}$, and gnd as shown. In one embodiment, when the transceiver is in differential receiver mode, the Differential Driver is configured as shown in FIGS. 5A-B.

Figure 4:
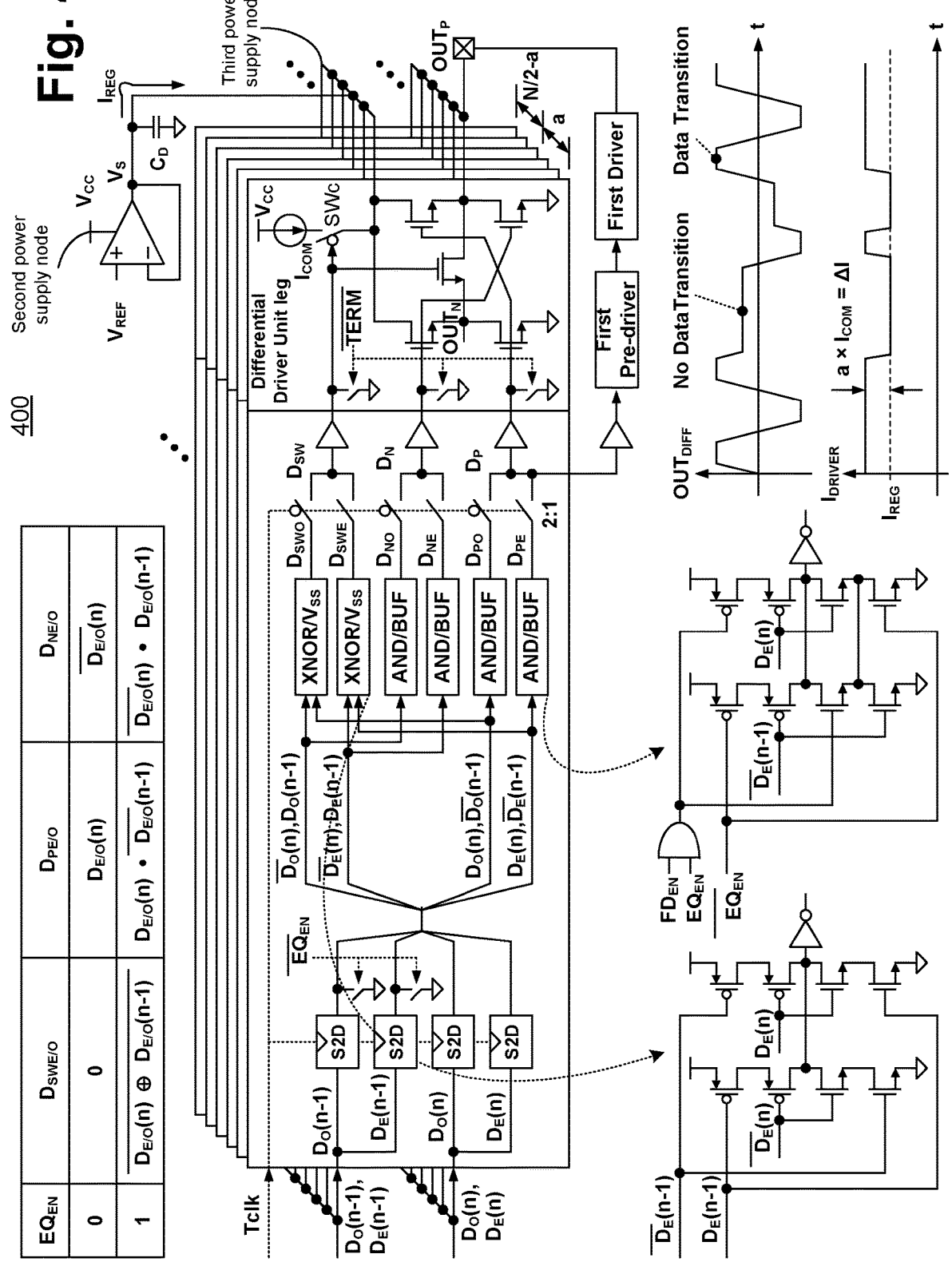
FIG. 4 illustrates a circuit level architecture of the Dual-Mode Transceiver with transmitter 2-tap equalization control and current compensation, according to one embodiment of the disclosure.

FIG. 4 illustrates circuit 400 with transmitter equalization control and current compensation, according to one embodiment of the disclosure. It is pointed out that those elements of FIG. 4 having the same reference numbers (or names) as the elements of any other figure can operate or function in any manner similar to that described, but are not limited to such.

Circuit 400 illustrates a configurable logic block used to implement the equalization logic functions with differential pre-emphasis, according to one embodiment. In one embodiment, circuit 400 includes the implementation of the EQ MUX 1, Logic 1, and Serializers 1 of FIG. 1 that provide signal inputs to the Differential Driver. In one embodiment, EQ MUX 1 and Logic 1 functionalities are consolidated by the parallel cascode CMOS circuits which realize AND, BUFFER (BUF), and XNOR functions with substantially matched delays to meet 2:1 serializer timing constraints. The AND/BUF and XNOR circuits are shown in FIG. 4 according to one embodiment. Here, the bar above the signal name or logic function indicates an inverse.

Since these logic circuits positioned before 2:1 serializers are based on the signal flow, the data subscript notations are highlighted by 'E', 'O', or 'E/O' meaning 'even', 'odd', or 'even or odd' data stream respectively. The logic truth table in FIG. 4 shows the logic relationship between inputs and output of these cascode CMOS circuits based on the equalization enable signal, $EQ_{EN}$. XNOR output can be set to VSS (i.e. ground voltage of the circuit) by forcing S2D output of $D_O(n-1)$ and $D_E(n-1)$ to the ground as shown in the FIG. 4. In the AND/BUF circuit, a control signal $FD_{EN}$ is used to switch this logic function between AND gate and BUFFER. In one embodiment, since First and Second Drivers are single-ended, their equalization logic functionality is different from the Differential Driver. In one embodiment, $FD_{EN}$ signal provides the reconfigurability of the cascode logic to support both single-ended and differential equalizations.

When $FD_{EN}=1$, the logic supports the First and Second Driver equalization. When $FD_{EN}=0$, the logic supports the Differential Driver equalization. In one embodiment, all of the NMOS device in each differential driver unit leg can turn OFF by 'TERM' signal. For example, when TERM=1, the Differential Driver unit leg input is controlled by the signal from the serializer and the pre-driver (i.e., this unit leg is ON). If TERM=0, the NMOS devices in the Differential Driver unit leg are all turned OFF (i.e., this unit leg is tri-stated or in high-impedance state). In one embodiment, by individually turning each differential driver leg ON or OFF with external (e.g., off-die) equipment, the entire transmitter/receiver termination in the differential driver can be calibrated to a desire value.

Based on the transmitter termination calibration result, equalization coefficients can be properly set by $EQ_{EN}$ with each transmitter data path slice, which is corresponding to each Differential Driver unit leg, according to one embodiment. For example, if 'N' unit legs are required to be turned on for the transmitter termination and 'a' legs of differential driver legs are controlled by their Logic slices with $EQ_{EN}=1$, then equalization coefficients is 0.5·a/N.

The Differential Driver current consumption ($I_{Driver}$) is data-dependent and related to the equalization coefficient settings. As shown in FIG. 4, in data transition state, the driver current consumption is higher than that in the no data transition states. This data-dependent driver current renders high-frequency self-induced noise at the driver supply $V_S$, which is the regulator output. Usually, the Regulator has to rely on a huge de-coupling capacitor, $C_D$, to minimize the impact of this self-induced noise on the $V_S$, since the current variation $\Delta I = C_D \cdot (dV_S/dt)$.

In one embodiment, a data-dependent current compensation scheme is employed to mitigate the problem due to high-frequency driver current variation on the regulator output $V_S$. Since the current variation ($\Delta I$) occurs whenever the equalization switch (i.e. the device sitting between $OUT_P$ and $OUT_N$) input toggles and the variation magnitude is proportional to equalization coefficients (0.5·a/N), the equalization switch input signal is reused to enable PMOS switch 'SWc' for the compensation current ($I_{COM}$) in each driver leg, according to one embodiment. In such an embodiment, the regulator supports DC current $I_{REG}$, which is the minimal driver required current as shown in FIG. 4, and any additional current due to data transition states are offered by the compensation currents from the 'α' driver legs which are controlled by $D_{SW}$. From the Regulator standpoint, the current variation becomes much smaller due to the compensation current, so the decoupling capacitor requirement correspondingly becomes lower, according to one embodiment. This compensation scheme may reduce the Regulator output capacitor size by at least 50%. In one embodiment, the strength of $I_{COM}$ can be adjusted by a 5-bit resolution current DAC (digital-to-analog converter) to optimize the cancellation of the data-dependent self-induced noise. In one embodiment, S2D 2, EQ MUX 2, Logic 2 and Serializer 2 have the same circuit block details as shown in FIG. 4. Some differences are: $D_O(n-1)$ and $D_E(n-1)$ is replaced by $D_O(n+1)$ and $D_E(n+1)$; First Pre-driver and First Driver is replaced by Second Pre-drive and Second Driver, 'a' and 'N/2−a' is replaced by 'b' and 'N/2−b'.

FIG. 5A illustrates a system 500 with transmitter and receiver modes of the differential driver configurations with DC coupling, according to one embodiment of the disclosure. FIG. 5B illustrates a system 520 with transmitter and receiver modes of the differential driver configurations with AC coupling, according to one embodiment of the disclosure. It is pointed out that those elements of FIGS. 5A-B having the same reference numbers (or names) as the elements of any other figure can operate or function in any manner similar to that described, but are not limited to such.

In FIG. 5A, the Differential Driver comprises 'Y' identical unit legs; 'N' legs are turned ON; 'Y−N' legs are turned OFF; 'N' is less than or equal to 'Y', where 'Y' and 'N' are integers. In one embodiment, each leg is fully NMOS push-pull differential low-swing voltage-mode driver. In one embodiment, NMOS equalization switches are positioned between the complimentary differential outputs of each driver leg. In one embodiment, both push-pull and equalization-switch devices are parts of the transmitter termination. In one embodiment, with a DC-coupled channel, the 'N' equalization-switch legs can be turned ON as a differential receiver termination in the receiver mode, and Y legs (e.g., 32 legs) of push-pull devices are turned OFF (i.e. tri-stated) as shown in FIG. 5A. With an AC-coupled channel (via capacitors $C_{AC1}$ and $C_{AC2}$), as shown in FIG. 5B, the (N−2) equalization-switch legs can be turned ON as a differential receiver termination in the receiver mode, and one leg of push-pull devices can be turned ON to support receiver common-mode voltage generation.

Figure 6:
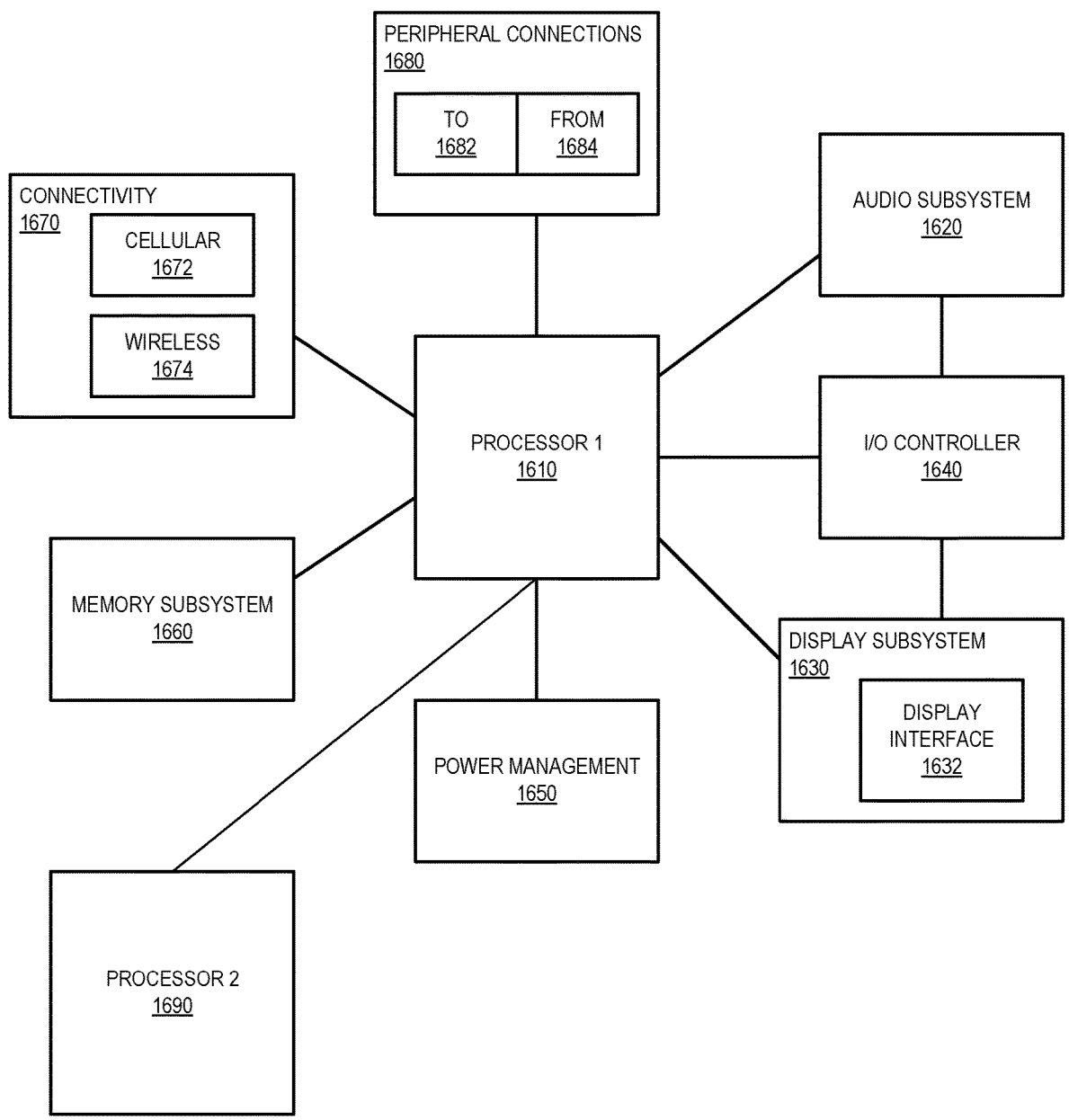
FIG. 6 is a smart device or a computer system or an SoC (System-on-Chip) with the Dual-Mode Transceiver, according to one embodiment of the disclosure.

FIG. 6 is a smart device or a computer system or a SoC (System-on-Chip) with the Dual-Mode Transceiver, according to one embodiment of the disclosure. It is pointed out that those elements of FIG. 6 having the same reference numbers (or names) as the elements of any other figure can operate or function in any manner similar to that described, but are not limited to such.

FIG. 6 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 apparatus with a Dual-Mode Transceiver described with reference to embodiments. Other blocks of the computing device 1600 may also include apparatus with a Dual-Mode Transceiver described with reference to embodiments. The various embodiments of the present disclosure may also comprise a network interface within 1670 such as a wireless interface so that a system embodiment may be incorporated into a wireless device, for example, cell phone or personal digital assistant.

In one embodiment, processor 1610 (and processor 1690) can include one or more physical devices, such as microprocessors, application processors, microcontrollers, programmable logic devices, or other processing means. Processor 1690 may be optional. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), Display- Port including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a first pad; a second pad; a first single-ended driver coupled to the first pad; a second single-ended driver coupled to the second pad; a differential driver coupled to the first and second pads; and a logic unit to enable of the first and second single-ended drivers, or to enable the differential driver. In one embodiment, the apparatus further comprises: a first power supply node to provide a first power supply to the first and second single-ended drivers; and a second power supply node to provide a second power supply to the differential pre-driver, wherein voltage level of the first power supply is higher than voltage level of the second power supply.

In one embodiment, the apparatus further comprises: a third power supply node; and a switch operable to cause a current path from the second power supply node to the third power supply node. In one embodiment, the apparatus further comprises: a regulator to provide regulated current to the third power supply node. In one embodiment, the apparatus further comprises logic to control the switch to cause the switch to couple the second power supply node to the third power supply node according to logic level of data used to drive equalization switches in the differential driver.

In one embodiment, the apparatus further comprises: a first data generation logic to provide first data for the first single-ended driver; and a second data generation logic to provide second data for the second single-ended driver. In one embodiment, the logic unit comprises a multiplexer for equalization. In one embodiment, the first and second single-ended drivers are operable to drive signals on the first and second pads respectively such that the swings of the signals is higher than swings generated by the differential driver. In one embodiment, each of the first and second single-ended drivers includes a push-up driver and a pull-down driver independent of passive resistors.

In one embodiment, each of the first and second single-ended drivers comprises thin-gate-oxide devices. In one embodiment, the push-up and pull-down drivers include cascode devices having diode connected devices and triode region devices. In one embodiment, the apparatus further comprises: a first equalizer coupled to the first single-ended driver and the differential driver; and a second equalizer coupled to the second single-ended driver and the differential driver. In one embodiment, the first and second equalizers are operable to provide higher order equalization to the differential driver than the first and second single-ended drivers. In one embodiment, the first the second single-ended drivers are DDR complaint drivers.

In another example, a dual mode driver is provided which comprises: first and second single-ended DDR compliant drivers; and a differential driver, wherein the first and second single-ended DDR compliant drivers are operable to drive signals with swings larger than signals driven by the differential driver. In one embodiment, the dual mode driver of claim 15 further comprises: a first equalizer coupled to the first single-ended driver and the differential driver; and a second equalizer coupled to the second single-ended driver and the differential driver.

In one embodiment, both the differential driver and the first and second single-ended drivers are operable to provide transmitter termination when operating in transmitter mode, and to provide receiver termination when operating in the receiver mode. In one embodiment, the dual mode driver further comprises: a first power supply node; a second power supply node coupled to the differential pre-driver; a third power supply node to receive power supply from the second power supply node by generated by a regulator; a switch operable to cause a current path from the second power supply node to the third power supply node; a logic to control the switch to cause the current path from the second power supply node to the third power supply node according to logic level of data used to drive equalization switches in the differential driver; and a N-bit current digital-to-analog converter to control the current strength injected from the second power supply node to the third power supply node.

In another example, a system is provided which comprises: a memory; and a processor coupled to the memory, the processor and memory comprising a reconfigurable transceiver according to the apparatus described above. In one embodiment, the system further comprises: a wireless interface for allowing the processor to communicate with another device. In one embodiment, the system further comprises a display unit.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   a first single-ended pre-driver to receive a first power supply voltage;
   a second single-ended pre-driver to receive the first power supply voltage; and
   a voltage regulator to receive a second power supply voltage and to generate a third power supply voltage, wherein the first single-ended pre-driver and the second single-ended pre-driver are to receive the third power supply voltage, wherein the first power supply voltage is higher than the second power supply voltage, and wherein the third power supply voltage is higher than ground.

2. The apparatus of claim 1, wherein the first power supply voltage is one of 1.2V or 5V, and wherein the second power supply voltage is 1V, and wherein the third power supply voltage is 0.2V.

3. The apparatus of claim 1 comprises a differential pre-driver, wherein when the first and second pre-drivers are enabled, the differential pre-driver is disabled, wherein the differential pre-driver receives the second power supply voltage.

4. The apparatus of claim 3, wherein a signal swing at an output of the differential pre-driver is lower than a signal swing at an output of the first single-ended pre-driver.

5. The apparatus of claim 3, wherein all transistors of the first and second single-ended pre-drivers and the differential pre-driver are thin gate-oxide transistors.

6. The apparatus of claim 3 comprises a symmetric post-cursor and pre-cursor differential transmitter data path.

7. The apparatus of claim 6 comprises logic to split the symmetric post-cursor and pre-cursor differential transmitter data path into two single-ended data paths for the first and second single-ended pre-drivers, respectively.

8. The apparatus of claim 3 comprises:
   a first equalizer coupled to the first single-ended pre-driver and the differential pre-driver; and
   a second equalizer coupled to the second single-ended pre-driver and the differential pre-driver.

9. The apparatus of claim 1, wherein the third power supply voltage is applied to some devices of the first and second single-ended pre-drivers when the first and second single-ended pre-drivers are disabled.

10. The apparatus of claim 1 further comprises:
    a first data generation logic to provide first data for the first single-ended pre-driver; and
    a second data generation logic to provide second data for the second single-ended pre-driver.

11. The apparatus of claim 1 comprises an N-bit current digital-to-analog converter to control a current strength of a current injected from a second power supply node to a third power supply node, wherein the second power supply node is to provide the second power supply voltage, and wherein the third power supply node is to provide the third power supply voltage.

12. An apparatus comprising:
    a first single-ended pre-driver coupled to a first power supply node which is to receive a first power supply voltage;
    a second single-ended pre-driver coupled to the first power supply node; and
    a differential pre-driver coupled to a second power supply node and a third power supply node, wherein the second power supply node is to receive a second power supply voltage, wherein the third power supply node is to receive a third power supply voltage, wherein the first single-ended pre-driver and the second single-ended pre-driver are to receive the third power supply voltage, wherein the first power supply voltage is higher than the second power supply voltage, and wherein the third power supply voltage is higher than ground.

13. The apparatus of claim 12 comprises a voltage regulator to receive the second power supply voltage and to generate the third power supply voltage.

14. The apparatus of claim 12, wherein the first power supply voltage is one of 1.2V or 1.5V, and wherein the second power supply voltage is 1V, and wherein the third power supply voltage is 0.2V.

15. The apparatus of claim 12 comprises a symmetric post-cursor and pre-cursor differential transmitter data path.

16. The apparatus of claim 15 comprises logic to split the symmetric post-cursor and pre-cursor differential transmitter data path into two single-ended data paths for the first and second single-ended pre-drivers, respectively.

17. The apparatus of claim 12 comprises an N-bit current digital-to-analog converter to control a current strength of a current injected from a second power supply node to a third power supply node, wherein the second power supply node is to provide the second power supply voltage, and wherein the third power supply node is to provide the third power supply voltage.

18. A system comprising:
    a processor;
    a memory coupled to the processor; and
    a wireless interface to allow the processor to communicate with another device, wherein the processor includes a reconfigurable transceiver which is operable to operate in single-ended or differential transmit or receive modes, wherein the transceiver comprises:
    a first single-ended pre-driver to receive a first power supply voltage;
    a second single-ended pre-driver to receive the first power supply voltage; and
    a voltage regulator to receive a second power supply voltage and to generate a third power supply voltage, wherein the first single-ended pre-driver and the second single-ended pre-driver are to receive the third power supply voltage, wherein the first power supply voltage is higher than the second power supply voltage, and wherein the third power supply voltage is higher than ground.

19. The system of claim 18, wherein the first power supply voltage is one of 1.2V or 5V, and wherein the second power supply voltage is 1V, and wherein the third power supply voltage is 0.2V.

20. The system of claim 18 comprises a differential pre-driver, wherein when the first and second pre-drivers are enabled, the differential pre-driver is disabled, wherein the differential pre-driver receives the second power supply voltage.

* * * * *